United States Patent
Nocedal De La Garza et al.

(10) Patent No.: US 11,561,968 B2
(45) Date of Patent: Jan. 24, 2023

(54) SYSTEMS AND METHODS FOR RETRIEVING RELEVANT INFORMATION CONTENT WHILE TYPING

(71) Applicant: MicroStrategy Incorporated, Tysons Corner, VA (US)

(72) Inventors: Jose Manuel Nocedal De La Garza, Leesburg, VA (US); Victor Hugo Pena, Falls Church, VA (US); Siyuan Fan, Falls Church, VA (US); Alexander Ryan Tsai, Chantilly, VA (US)

(73) Assignee: MICROSTRATEGY INCORPORATED, Tysons Corner (VA)

( * ) Notice: Subject to any disclaimer, the term of this patent is extended or adjusted under 35 U.S.C. 154(b) by 0 days.

(21) Appl. No.: 17/179,479

(22) Filed: Feb. 19, 2021

(65) Prior Publication Data

US 2021/0342338 A1 Nov. 4, 2021

Related U.S. Application Data

(60) Provisional application No. 62/979,128, filed on Feb. 20, 2020.

(51) Int. Cl.
| | |
|---|---|
| *G06F 16/242* | (2019.01) |
| *G06F 3/0489* | (2022.01) |
| *H04L 51/046* | (2022.01) |
| *G06F 16/248* | (2019.01) |

(52) U.S. Cl.
CPC ........ *G06F 16/2428* (2019.01); *G06F 3/0489* (2013.01); *G06F 16/248* (2019.01); *H04L 51/046* (2013.01)

(58) Field of Classification Search
None
See application file for complete search history.

(56) References Cited

U.S. PATENT DOCUMENTS

| | | | | |
|---|---|---|---|---|
| 9,165,406 | B1* | 10/2015 | Gray | G06V 20/20 |
| 2007/0040813 | A1* | 2/2007 | Kushler | G06F 3/0237 |
| | | | | 345/173 |
| 2007/0280179 | A1* | 12/2007 | Van Belle | G06F 3/04842 |
| | | | | 370/338 |
| 2010/0017478 | A1* | 1/2010 | Mejia | G06Q 10/00 |
| | | | | 709/206 |
| 2012/0131451 | A1* | 5/2012 | Abe | G06F 3/0488 |
| | | | | 715/260 |

(Continued)

*Primary Examiner* — Toan H Vu
(74) *Attorney, Agent, or Firm* — Bookoff McAndrews, PLLC

(57) ABSTRACT

Methods, systems, and apparatus, including computer programs stored on computer-readable media, for retrieving relevant information content while typing are disclosed. Upon identifying text being entered by a user into a text field of a typing-enabled application, one or more keywords may be determined that match the text. The matching keywords may be presented for selection. Upon receiving a selection of a keyword, an information card related to the selected keyword may be retrieved and presented. In addition to presenting the information card, information content associated with the information card may be inserted into the text field of the typing-enabled application.

19 Claims, 11 Drawing Sheets

(56) References Cited

U.S. PATENT DOCUMENTS

| | | | | |
|---|---|---|---|---|
| 2013/0046544 | A1* | 2/2013 | Kay | G06F 3/023 |
| | | | | 345/169 |
| 2013/0325839 | A1* | 12/2013 | Goddard | G06F 16/9535 |
| | | | | 707/708 |
| 2013/0344468 | A1* | 12/2013 | Lindsay | G06Q 30/0201 |
| | | | | 434/322 |
| 2014/0115070 | A1* | 4/2014 | Virtanen | G06Q 10/107 |
| | | | | 709/206 |
| 2014/0304103 | A1* | 10/2014 | Barton | G06Q 10/0835 |
| | | | | 705/26.4 |
| 2015/0074138 | A1* | 3/2015 | Nam | G06F 16/90324 |
| | | | | 707/767 |
| 2017/0308291 | A1* | 10/2017 | Luipold | G06F 16/2455 |
| 2018/0350144 | A1* | 12/2018 | Rathod | G06T 13/40 |

* cited by examiner

SYSTEMS AND METHODS FOR RETRIEVING RELEVANT INFORMATION CONTENT WHILE TYPING

RELATED APPLICATION(S)

This application claims priority to U.S. Provisional Application No. 62/979,128 filed Feb. 20, 2020, the entire disclosure of which is hereby incorporated herein by reference in its entirety.

TECHNICAL FIELD

The present disclosure relates generally to retrieving relevant information content while typing text and, more particularly, to transferring the retrieved information content between different applications and sharing the retrieved information content with other users in a convenient and customized manner.

BACKGROUND

Databases often include information about many topics. Users often retrieve content by issuing a query, for example, using natural language or using structured query language (SQL). As data analytics and retrieval techniques rapidly advance, data customization and exchange between users have also become an important part of data analytics delivery.

The present disclosure is directed to addressing one or more of these challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In one embodiment, a computer-implemented method of retrieving relevant information content while typing may comprise: identifying, by an application extension of a first application, text being entered by a user into a text field of a second application; determining, by the application extension, one or more keywords in a keyword list that match the text; presenting, by the application extension, the one or more keywords; receiving, by the application extension, a selection of a keyword from the one or more keywords; retrieving, by the first application, an information card related to the selected keyword; presenting, by the first application, the information card; and inserting, by the second application, information content associated with the information card into the text field.

In one embodiment, a system may comprise: one or more processors; and one or more computer-readable media comprising instruction that, when executed by the one or more processors, cause the one or more processors to perform operations for retrieving relevant information content is provided. The operations may comprise: identifying, by an application extension of a first application, text being entered by a user into a text field of a second application; determining, by the application extension, one or more keywords in a keyword list that match the text; presenting, by the application extension, the one or more keywords; receiving, by the application extension, a selection of a keyword from the one or more keywords; retrieving, by the first application, an information card related to the selected keyword; presenting, by the first application, the information card; and inserting, by the second application, information content associated with the information card into the text field.

In one embodiment, one or more non-transitory computer-readable media are provided, which may store instructions that, when executed by one or more processors, cause the one or more processors to perform operations for retrieving relevant information content. The operations may comprise: identifying, by an application extension of a first application, text being entered by a user into a text field of a second application; determining, by the application extension, one or more keywords in a keyword list that match the text; presenting, by the application extension, the one or more keywords; receiving, by the application extension, a selection of a keyword from the one or more keywords; retrieving, by the first application, an information card related to the selected keyword; presenting, by the first application, the information card; and inserting, by the second application, information content associated with the information card into the text field.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
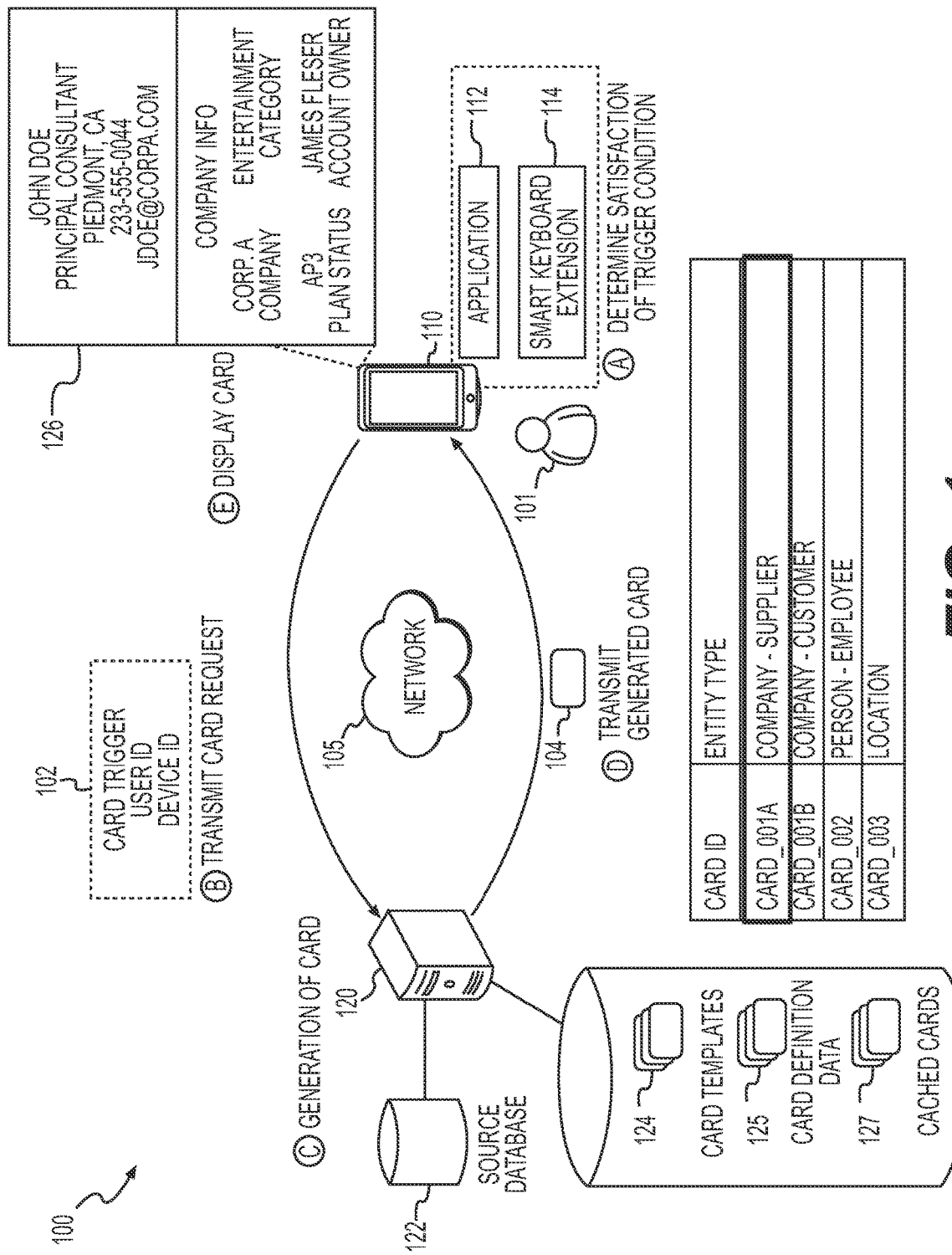
FIG. 1 is a diagram of an exemplary system and method capable of generating and presenting customized information cards, according to one aspect of the present disclosure.

The following embodiments describe systems and methods for retrieving relevant information content while typing text and, more particularly, for transferring the retrieved information content between different applications and sharing the retrieved information content with other users in a convenient and customized manner.

In the present disclosure, a computing system may run software that monitors conditions and operations of a computing device and detects when information content is relevant to the current context of the computing device. In response to detecting an appropriate context, the computing system may present an information card with content from a database, or a control allowing the user to access the information card. In many conventional systems, a user needs to submit a query, open or switch to a specific application, or otherwise take steps to request desired information content. By contrast, the systems and methods discussed in the present disclosure may allow information content to be provided automatically, without requiring the user to manually request and seek out the content, and/or without requiring the user to close or minimize an application and open another application to request and view the content. In many cases, the technique may allow database content relevant to a user's current task or activity to be provided, often without requiring the user to leave a current user interface. For example, as a user creates a message by typing text on a user interface, information content determined to be relevant to the message (i.e., typed text) or a portion of the message may be made available on the current user interface.

To that end, in some embodiments, a smart keyboard extension may be provided to enable automatic detection of keywords within text entered by the user. As the user is typing or entering text into a text field of a typing-enabled application, a smart keyboard by which the user enters the text may present keywords that match the text or a portion of the text entered by the user, substantially in real-time. The user may select a keyword presented by the smart keyboard, and the keyword may be used to search for relevant information content such as, for example, information cards. In lieu of automatically determining keywords based on user-entered text, the smart keyboard may also or alternatively allow the user to manually provide a search keyword, which may be used to query a database for relevant information cards. One or more information cards that are returned as the results of the query may be presented to the user for, e.g., inclusion in the text field. Once the user selects an information card to include in the text field, the information card may be inserted into an appropriate location within the text field. Further, in lieu of appending the entire information card in the text field, the user may select one or more portions of the information card, retrieve text strings pertaining to the selected portions of the information card, and include the retrieved text strings at an appropriate location within the text field. These functionalities may be provided to the user with minimal disruption to the user's typing activity. For example, the functionalities may be provided without requiring the user to close out of the typing-enabled application, open a search application, perform the search within the user interface of the search application, copy a portion or an entirety of the retrieved information content, close the search application, open the typing-enabled application, and insert the retrieved information content in the text field of the typing-enabled application. In other words, the user does not need to switch between interfaces of the typing-enabled application and search application to search, retrieve, and insert relevant information content into the text being entered by the user, which may be extremely cumbersome. The user may seamlessly transition between activities of typing, searching, and inserting relevant information content without experiencing frequent interruption, and avoiding unnecessary confusion, delay, and inefficiency in completing the user's task.

Upon inserting an information card or text strings associated with sections of the information card into the text field, the user may further modify the text within the text field. Based on the modified text, the user may retrieve, select and insert additional information cards or text strings associated with portions of the information cards. The user may also execute other functionalities enabled by the typing-enabled application such as sending the completed text to other users, saving the completed text as an entry, etc.

The subject matter of the present disclosure will now be described with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Referring now to the appended drawings, FIG. 1 is a diagram of an exemplary system capable of generating and presenting customized information cards. The system 100 may include a client device 110, a server 120, and a network 105. The server 120 may have access to a source database 122 for an entity such as, for example, an organization or a company. The server 120 may be implemented using a single computer, or multiple computers that cooperate to perform the functions discussed below, which may be located in a single geographic location or remotely from one another.

The client device 110 may include an application 112 that enables the client device 110 to dynamically generate and display contextually-relevant information cards in response to certain actions being performed on the client device 110 or certain conditions of the client device 110 being detected. As discussed below, the application 112 may allow the client device 110 to obtain and provide information from the source database 122 through information cards that can be dynamically adjusted based on the actions or conditions detected on the client device 110. In some embodiments, the application 112 may run in the background, out of view of the user, and monitors conditions of the client device 110 on an ongoing basis. The application 112 may interact with an operating system of the client device 110, for example, using one or more application programming interfaces (APIs), to obtain various types of content, such as image data and/or text displayed on screen, image data or text of user interfaces of applications (which may or may not be currently displayed on screen), device notifications, messages (e.g., e-mails or SMS text messages), calendar data, received radiofrequency beacon messages, and so on.

The client device 110 may also include a smart keyboard extension 114 that works in conjunction with the application 112. The smart keyboard extension 114 may be installed on the client device 110 to provide a custom digital keyboard, which a user 101 may select and use to type text and perform other functionalities in various typing-enabled applications (e.g., an email application, a messaging application, a word processing application, a calendar or planner application, etc.). The custom keyboard enabled by the smart keyboard extension 114 will be referred to herein as a smart keyboard. Notably, the smart keyboard extension 114 may be an application extension associated with the application 112, to add new functionalities and enable certain existing functionalities of the application 112 to be available with the custom keyboard. The smart keyboard extension 114 may enable a user 101 to view and share information content that is relevant to text (or a portion thereof) typed by the user 101 using the smart keyboard. The smart keyboard extension 114 may monitor the text being typed by the user 101 in substantially real-time, determine one or more keywords that match or are related to the text (or a portion thereof), enable the user 101 to select one of the keywords, and transmit the selected keyword to the application 112 to run a search for an information card associated with the keyword. In this case, user selection of the keyword may be the trigger condition that initiates the search and retrieval of the relevant information card(s). Upon the application 112 retrieving the information card(s), the smart keyboard extension 114 may present the information card(s) to the user 101 and allow the user 101 to share the information card(s) or content thereof with other users via functionalities of the typing-enabled application (e.g., via email, text message, calendar invite, etc.). Further, the smart keyboard extension 114 may allow the user 101 to manually input a keyword to search for an information card, in addition to automatically detecting keywords based on user-typed text. The functionalities of the smart keyboard extension 114 will be discussed in greater detail below.

The client device 110 may be associated with a user 101. When the application 112 is installed on the client device 110, a user 101 may be identified by the application 112. For example, the user 101 may log in using one or more credentials. The application 112 may then customize various aspects of the system for the user 101, including, e.g., trigger conditions used to detect an appropriate context for providing an information card as well as the type of content included in information cards.

For example, the user 101 may be a member of an organization, e.g., an employee of a company. The source database 122 may represent database records stored by or for the organization. The records may not be publicly available and may be subject to data access restrictions, such as requirements that users be issued credentials from the organization that grant authorization to access the records. Different users may be granted different levels of authorization, and the server 120 may enforce access restrictions so that each user may be only allowed to access the subsets of information the user is authorized to access.

The system 100 may improve techniques used to provide users with access to information in a more convenient and contextually relevant fashion. Information is presented through digital information cards that are displayed at specified points in time based on the satisfaction of context-based trigger conditions, which represent the relevance of specific topics or keywords to the activities of the client device 110. In this manner, the system 100 may improve the relevance of information that is displayed to a user based on actions performed on the client device 110 and may ensure that the displayed information is likely of interest to the user at the time the information is displayed. Unlike many other systems, the user 101 may not need to manually submit a query or select from a list to obtain the information. Instead, the application 112 may initiate display of the information as it detects that the information corresponds to the current context of the client device 110.

In FIG. 1, information cards are presented on the client device 110 as cards that include information obtained from the source database 122. The cards may include dynamically generated information so that they reflect changes or updates to data stored in the source database 122. For example, the server 120 may store card templates 124 that identify, for example, the content, format, and structure of the cards. The specific information that is displayed in the cards may be dynamically populated into the templates at the time the cards are determined to be relevant (e.g., upon detecting a context-based trigger condition), so that each display of a card includes information generated from up-to-date information from the source database 122. Thus, if the same card for the same entity is displayed at different times, the content may be different for each instance of the card as the information in the source database 122 changes.

The card templates 124 may include different templates for different types of entities. For example, one template may be used for a person, another template may be used for a company, another template may be used for a location (e.g., a particular store or region), and so on. Different card templates 124 may also be defined and used for entities having different semantic relationships with the user 101, the user's organization, or others. For example, a first template may be used for companies that are suppliers, and may specify a first set of statistical measures to display in a card. A second template for customers may specify a different set of statistical measures to display in a card.

The system 100 may also store card-specific information in card definition data 125 that specifies the parameters of individual cards. The card templates 124 may each represent characteristics of cards for a particular type of entity or class of entities, and the card definition data 125 may specify the particular card parameters for specific entities. Although cards for different entities of the same type may use the same card template 124, each individual card may have specific information that affects its content and presentation. For example, a card definition for a specific entity may include, e.g., an entity identifier, an identifier of the card template to be used for the entity, an indication of the keywords to be used to trigger presentation of the card for the entity, a mapping of data source elements to the components of the card template (if not already specified in the card templates 124), and so on. For example, a card definition for a company "Example Co." may specify that the "CARD_001A" template should be used, and that the specific set of keywords that trigger display of that company's card are "Example Co.," "Example," and "EC." The card definition data 125 may include a card definition record for each information card made available in the system 100. The card definition data 125 may also be used to customize (e.g., alter or override) aspects of the card templates.

In FIG. 1, the application 112 on the client device 110 may detect a context-based trigger condition, such as a keyword representing an entity having corresponding information in the database 122. For example, such a keyword may be received from the smart keyboard extension 114, or may be received from a search interface provided by the application 112. The application 112 may cause the client device 110 to request an information card, and the server 120 may determine an appropriate information card template and/or card definition data, generate the information card, and send data for the card back to the client device 110 for display. This process is explained in further detail below with respect to various stages labelled (A) through (E).

In stage (A), the application 112 may monitor activity on the client device 110 to detect satisfaction of a trigger condition that specifies display of an information card on the client device 110. Trigger conditions may represent activity on the client device 110 indicating that the user 101 is likely to view or hear information.

The trigger conditions may be monitored passively without requiring the user 101 to provide input on the client device 110. For example, detection of an entity term (e.g., a name, address, contact information, or keyword associated with an entity) in the text corresponding to an upcoming calendar appointment through a calendar application of the client device 110 may represent satisfaction of a trigger condition indicating that a user is likely to view information associated with the entity. In this case, the client device 110 may monitor calendar data of the calendar application without the user 101 actively requesting the information, which reduces the number of user inputs required to display contextually-relevant information (i.e., information for an entity that is a participant to the calendar appointment).

In another example, the trigger condition may represent a location of the client device 110 being detected within threshold proximity (e.g., within 100 meters, 50 meters, 25 meters, etc.) of a geographic location that is associated with information cards. For example, the application 112 may determine that the user 101 is likely to view conference information based on the location of the client device 110 in proximity to a conference center, and thereby determine that a trigger condition has been satisfied.

As alluded to above, a trigger condition may represent an action performed by the user 101 on the client device 110 that relates to a particular entity or topic. For example, a user's selection of a keyword associated with an entity, which may have been presented to the user 101 upon the user 101 typing matching text using the smart keyboard, may represent satisfaction of a trigger condition for generating an information card for that entity. In some other examples, a trigger condition may represent a search query received for an entity term, or some other action performed on the client device 110 that indicates that the user 101 is requesting information such as, e.g., performing a web search through a browser application, performing a search using capabilities of the operating system (e.g., for an application, a file, etc.), performing a search via a search interface of the application 112, among others.

In stage (B), the client device 110 may transmit a card request 102 to the server 120. The card request 102 may include the keyword(s) or term(s) identified as corresponding to an entity, or an indication of the entity determined to be relevant to the current context. Accordingly, the card request 102 may include monitored data collected at the client device 110, such as data indicating the trigger condition that was determined to be satisfied by the application 112. The card request 102 may also include an identifier for the user 101 and/or the client device 110. The identifiers may be used to customize the information that is displayed on the client device 110. For example, the organization managing the source database 122 may specify different levels of access to the source database 122 based on a user classification specified by a user or device identifier. In this manner, the system 100 may generate and display different information cards for users of different access levels, even in response to satisfaction of the same trigger condition.

In stage (C), upon receiving the card request 102, the server 120 may access the source database 122 and generate one or more information cards that are provided to the client device 110 in response to the card request 102. The server 120 may generate information cards that are relevant to entity terms corresponding to the trigger condition detected in stage (A). For example, the server 120 may generate cards that include information for an entity that was identified in text displayed at the client device 110, such as a calendar appointment, a text message, a search interface, an email, etc. As another example, the server 120 may generate cards that include information relating to an entity that was identified in text typed by the user 101 using the smart keyboard. Such text may be found in a user interface of the operating system or an application different from the application 112 (i.e., a typing-enabled application). As yet another example, the server 120 may generate cards that include information for an entity that is associated with a keyword provided by the user 101 via a manual search function available in the application 112. In some situations, the reference to the entity may be detected by the client device 110 in data that is not part of a user interface, such as the content of a notification, message, or record accessed by the client device 110. The selected information card(s) may include information corresponding to the entity in the source database 122.

Generating an information card may include determining that a keyword matching a particular information card definition record has been found. The matching card definition in the card definition data 125 may specify an entity identifier for a particular entity, a card template 124 for generating the card, and locations of information about the particular entity in an appropriate data source (e.g., in the source database 122). The server 120 may then generate the card using the layout and content types specified by the appropriate card template 124, with values being populated from the data sources. For example, the attributes and/or metrics specified for fields or regions of a card template 124 may be populated with values for the particular entity as determined from the source database 122. Furthermore, an information card may include a summary of various attributes and/or metrics associated with the entity, which the server 120 may generate based on data collected from one or more data sources connected to the network 105. For example, an information card associated with a company may include a description of the company's overall performance in terms of revenue, sales, customer satisfaction, etc. Such a description may be generated by the server 120 based on attributes and/or metrics (and corresponding values) collected for the entity.

Information cards may be generated on-demand, in response to card requests as noted above. In addition or as an alternative, information cards may be generated predictively, in advance of requests for the cards, and then cached. The cached cards may be refreshed periodically, e.g., after a certain time has elapsed or if underlying data affecting the content of a card has changed. As a result, cached cards 127 may be made available with very low latency.

In stage (D), the server 120 may transmit an information card 104 for presentation on the client device 110. In some embodiments, more than one information card 104 may be retrieved at the server 120 and transmitted to the client device 110. In stage (E), upon receiving the information card 104 from the server 120, the client device 110 may display the information card 104 on a user interface 126. The information card 104 may be presented in or with a current user interface of the client device 110, which may be included in the application 112 or not. For example, the information card 104 may be provided through the operating system (OS) functionality of the client device 110 outside of the application 112, e.g., as an OS notification. In general, the information card 104 may be displayed in, alongside, or on (e.g., as an overlay to) the application or interface that has the term(s) that triggered the presentation of the information card 104, such as the current interface of the client device 110, whether the current application or interface is one for messaging, search, calendar management, and so on, or even a lock screen or home screen showing general system notifications. In some instances, the information card 104 may be presented through the application 112, e.g., as an application message, or a data object presented on a user interface of the application 112. The information card 104 may also be displayed in different formats, such as an image and/or an interactive control configured to initiate display of the information, e.g., a button that displays the information in response to receiving a user input.

As an example, with reference to FIG. 1, the application 112 may detect an upcoming calendar event for an upcoming meeting with an employee of an entity "Corporation A." The application 112 may determine that a calendar event trigger condition has been satisfied based on processing calendar data of the client device 110, and may determine that text corresponding to the calendar event references the entity. As another example, the application 112 may receive a keyword associated with the entity from the smart keyboard extension 114, upon a user 101 selecting the keyword among multiple keywords matching the text typed by the user 101, or upon the user 101 manually entering the keyword using a manual search function provided by the smart keyboard extension 114 in conjunction with the application 112. Based on the received keyword, the application 112 may determine that a trigger condition has been satisfied.

The server 120 may receive the card request 102 from the client device 110, select a card template, e.g., "CARD_001A", and specify the generation of an information card 104 for a supplier, e.g., "JOHN DOE" identified in the calendar appointment or the text entered by the user 101. The server 120 may obtain information associated with "JOHN DOE" from the source database 122 in order to populate a card template with information about the particular entity that is relevant to the user 101.

As shown in FIG. 1, the information card 104 displayed on the user interface 126 may include information for "JOHN DOE," an employee of a supplier company for the company of the user 101. The server 120 may retrieve information for this employee from the source database 122 since the calendar appointment detected by the application 112 or the typed text detected by the smart keyboard extension 114 identifies "JOHN DOE." In these examples, the system 100 may thus process calendar data to determine that the user 101 has an upcoming meeting with "JOHN DOE" or may process the text being entered by the user 101 to determine that the user 101 may be interested in finding more information about "JOHN DOE," and may determine that the user 101 would benefit from receiving employee information.

Figure 2:
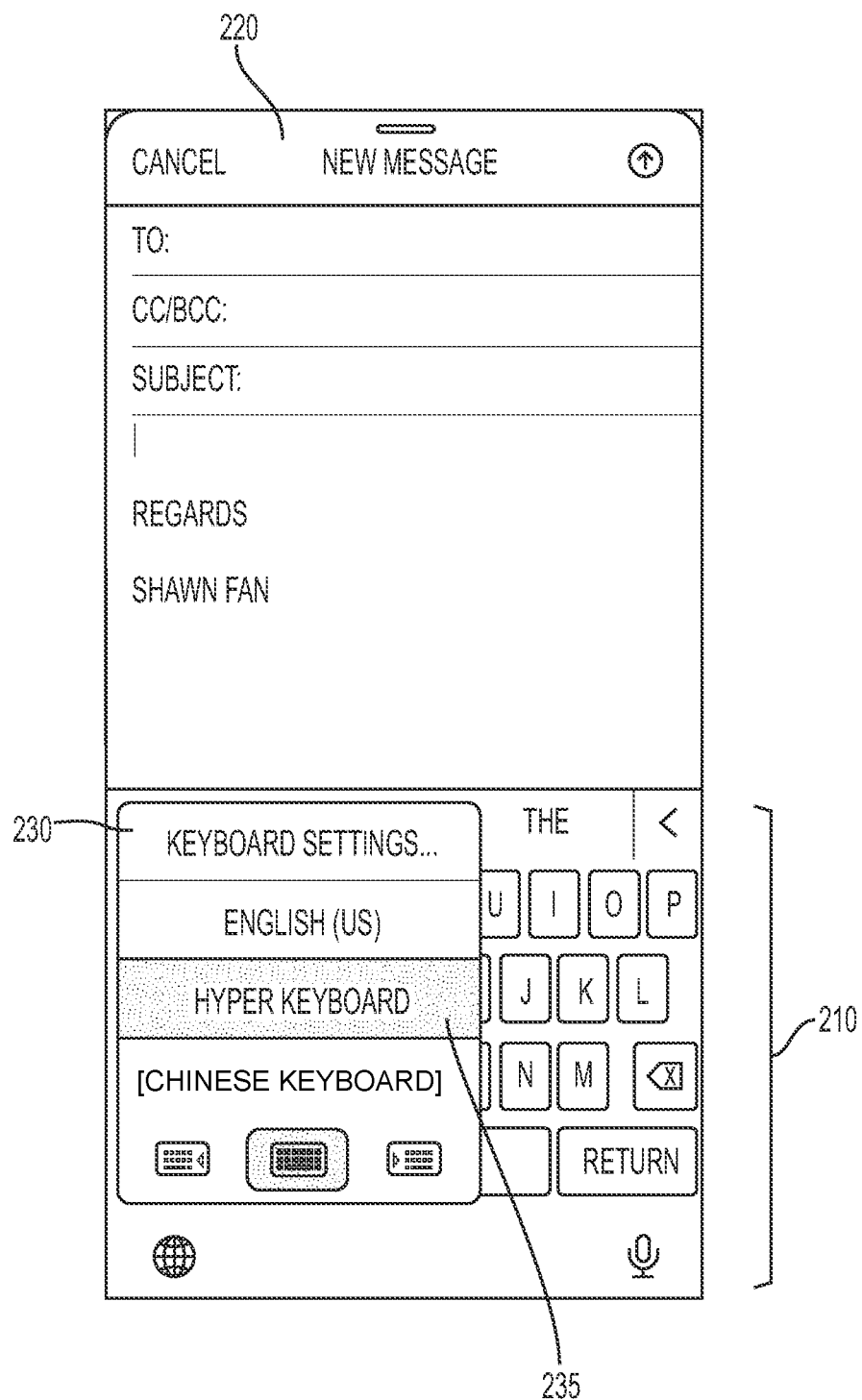
FIG. 2 illustrates a user interface in a process of activating a smart keyboard while using a typing-enabled application, according to one aspect of the present disclosure.

FIG. 2 illustrates an example of a user interface in a process of activating a smart keyboard while using a typing-enabled application. In the example of FIG. 2, the typing-enabled application 220 is an e-mail application. When a user 101 open the typing-enabled application 220, a built-in digital keyboard 210 may be initially displayed at the bottom of the user interface, allowing the user to start typing into appropriate text fields. A button or control to open a keyboard settings menu 230 may be placed at any suitable location on or near the keyboard 210. When the user 101 clicks or taps on the button, the keyboard settings menu 230 may open up, listing custom keyboards available for use in the typing-enabled application 220. From the menu 230, the user 101 may be able to select a smart keyboard option 235 (named "HYPER KEYBOARD," for example). Upon the user selecting the smart keyboard option 235, the displayed keyboard may switch from the built-in keyboard 210 to a smart keyboard 240 shown in FIG. 4 for example. In some embodiments, the user may be given an option to set the smart keyboard 240 as the default keyboard for the typing-enabled application 220, or for all typing-enabled applications installed on the client device 110. If the smart keyboard 240 is set as the default keyboard, the smart keyboard 240 may be displayed initially whenever the typing-enabled application 220 or any typing-enabled application on the device 110 is opened. As explained above, the smart keyboard extension 114 may monitor text being entered by the user 101 using the smart keyboard 240 and determine whether the text matches one or more keywords associated with entities. The keywords associated with entities may be provided in a keyword list, which may be downloaded from the server 120 and stored locally at the client device 110, or which may be provided remotely and accessed by the client device 110 by, e.g., a network connection. The smart keyboard extension 114 may present the keywords on or near the smart keyboard 240 for user selection, which may lead to presentation of one or more information cards for the entity associated with the selected keyword. In another embodiment, the smart keyboard extension 114 may present a manual search option on the keyboard 240, the selection of which may guide the user 101 to manually search for an information card via a manual search functionality of the application 112.

Figure 3:
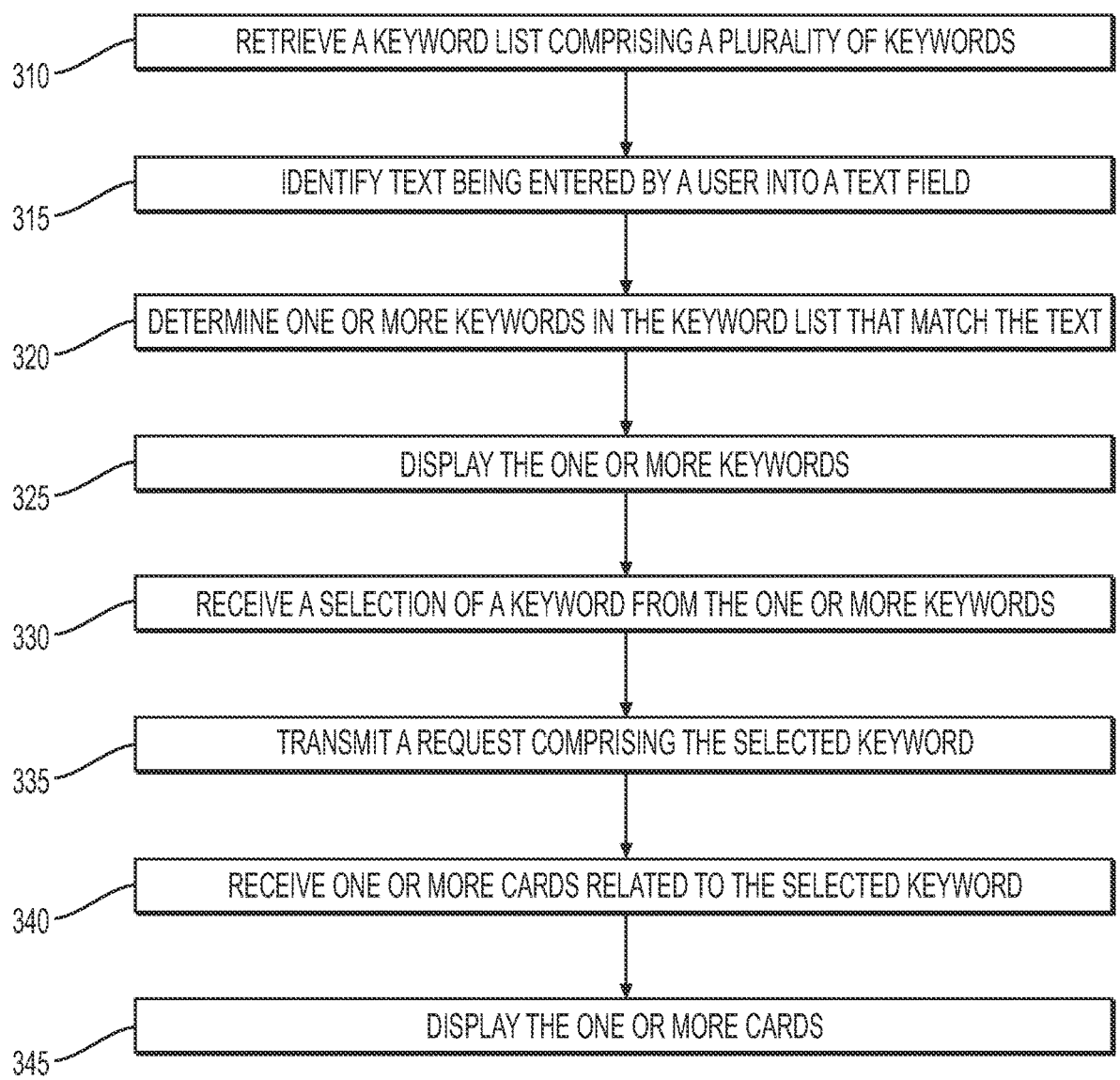
FIG. 3 is a flowchart illustrating an exemplary method of retrieving an information card while typing text using a smart keyboard, according to one aspect of the present disclosure.

FIG. 3 is a flowchart illustrating an exemplary method 300 of retrieving an information card while typing text using a smart keyboard, according to one aspect of the present disclosure. Notably, the method 300 may be performed by the smart keyboard extension 114 in conjunction with the application 112. At step 310, the smart keyboard extension 114 may retrieve a keyword list comprising a plurality of keywords. As alluded to above, the keywords in the keyword list may represent entities associated with corresponding information cards. The server 120 may provide the keyword list to the client device 110 for use by the smart keyboard extension 114 and/or the application 112. The keyword list may be stored in a client storage, which may comprise non-volatile storage, or a client memory, which may comprise volatile storage, where the client memory may provide faster data access speeds than the client storage. The keywords may be set by, e.g., an administrator for the system 100. In some implementations, the keywords may be generated by the server 120, for example, by pulling keywords from portions of a database or other data sources. For example, the server 120 may access database tables that list entity names (e.g., for competitors, suppliers, partner organization, employees, customer contacts, etc.) as well as abbreviations and/or nicknames for them. In some embodiments, the keywords may be pulled and/or generated from data sources using one or more machine learning algorithms. Any machine learning algorithm that is now known or later developed, and that may be suitable for identifying and/or generating keywords based on stored or received data may be utilized. Based on the identity and role of the user 101, the server 120 may filter the list, e.g., limiting the extracted set of keywords to those having information determined to be relevant to the role of the user 101 and/or those for which the user 101 has security permissions to access corresponding data. Therefore, at step 310, the keyword list may be retrieved based on user credentials such as, for example, user login information including login ID and password, or any other user data suitable for use as user credentials. The set of keywords may be further limited to keywords for types of entities for which appropriate information card templates have been defined. The filtered list of keywords can then be provided to the client device 110.

In some embodiments, a user 101 may be able to customize the keyword list. For example, the application 112 may provide a user interface allowing the user 101 to edit the keyword list, e.g., to add or remove keywords from the list that will be identified/matched in the future. These changes can be customized for the specific user identity of the user 101 who is logged in and/or for the specific client device 110 used. The user interface may allow edits for individual keywords, or for groups or categories of keywords. Similarly, it can expand the keyword list to include keywords that might not be directly related to the user's role but still relate to the user's interests.

With continuing reference to FIG. 3, at step 315, the smart keyboard extension 114 may identify a text being entered by a user into a text field. The text may comprise one or more terms, a portion of a term, multiple terms, or a combination thereof. The text may be identified by, for example, taking a screenshot of the user interface of the typing-enabled application 220 and identifying the text using an optical character recognition technique, identifying a sequence of alphabetical, numeric, or alphanumeric characters entered by the user 101 from memory, etc. At step 320, the smart keyboard extension 114 may determine one or more keywords in the keyword list that match the text. The determination may be made using any suitable string matching algorithm such as, for example, an exact string matching algorithm, a fuzzy string matching algorithm, a neural matching algorithm, etc. At step 325, the smart keyboard extension 114 may display the one or more keywords that match the text. If there are multiple matching keywords, the keywords may optionally be displayed in an alphabetical order, or in a ranked order using any suitable ranking algorithm. The matching keyword(s) may be displayed on or near the smart keyboard interface, for example as shown in stage 400A of FIG. 4. At step 330, the smart keyboard extension 114 may receive a selection of a keyword from the one or more displayed keywords. The user 101 may make a selection by hovering over, clicking, or tapping on a keyword, or making any other suitable motion or action that may signal user selection. The selected keyword may be supplied to the application 112, upon which the application 112 may determine that a trigger condition has been satisfied for requesting an information card.

At step 335, the application 112 may transmit a card request or a query comprising the selected keyword to a server 120. As explained above, the request may comprise additional information such as a user ID, a device ID, etc., to further customize the information card and/or content contained therein. In response to the card request, the server 120 may generate one or more information cards using card templates an/or card definition data associated with the selected keyword, as explained above in reference to FIG. 1. At step 340, the application 112 may receive the one or more information cards related to the selected keyword from the server 120. At step 345, the application 112 may display the one or more information cards via the user interface of the application 112 or the user interface of the smart keyboard 240. The manner in which the keywords as well as the information cards are displayed to the user 101 via a user interface will be explained in greater detail below in reference to FIG. 4.

In an alternative embodiment, at step 335, instead of transmitting a card request to a server 120, the application 112 may run a query against local storage (e.g., on the client device 110) for an information card associated with the selected keyword. For instance, a local storage of the client device 110 may store information cards that were previously received from the server 120. The local storage may comprise a cache storage (e.g., volatile storage) configured to store information cards received from the server 120 for a limited or predetermined amount of time, or a persistent storage (e.g., non-volatile storage) configured to store information cards received from the server 120 for a limited or predetermined amount of time, or until the user 101 or another user of the client device 110 deletes the information card.

In some embodiments, the user 101 may choose to manually search for an information card. For example, the user 101 may open a manual search interface by selecting a button or control presented with the smart keyboard 240, which may initiate a manual search function enabled by the application 112. Upon entering the manual search mode, the user 101 may be able to enter text in a search field (i.e., search box or search bar), which may be used by the application 112 to determine whether there is any keyword matching the text. The application 112 may transmit a card request including the matching keyword to the server 120, receive one or more information cards related to the keyword, and display the one or more information cards, as explained above at steps 335, 340, and 345 of method 300.

Figure 4:
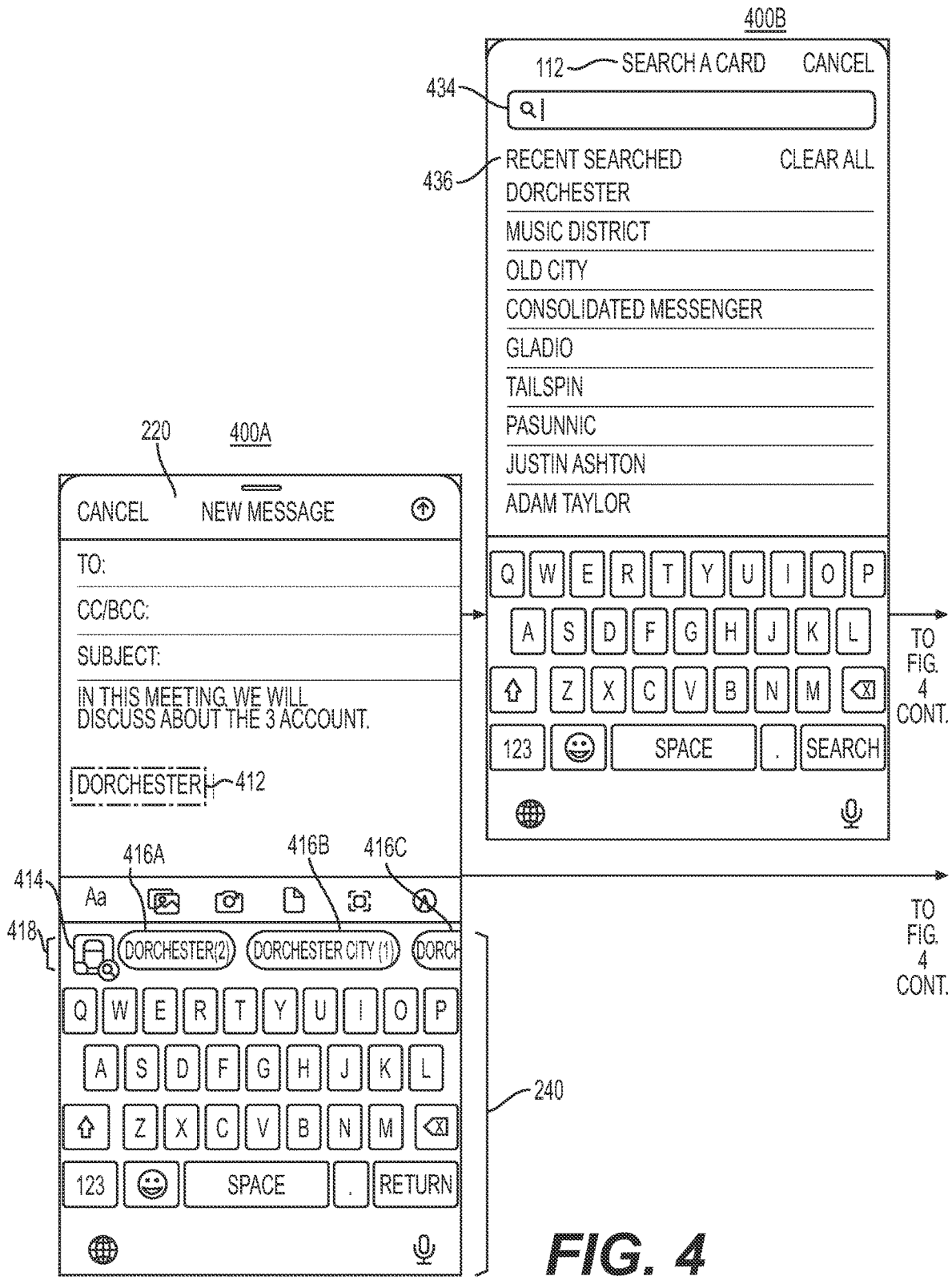
FIG. 4 shows sequential views of a user interface enabling text input for keyword identification, according to one aspect of the present disclosure.
Figure 4:
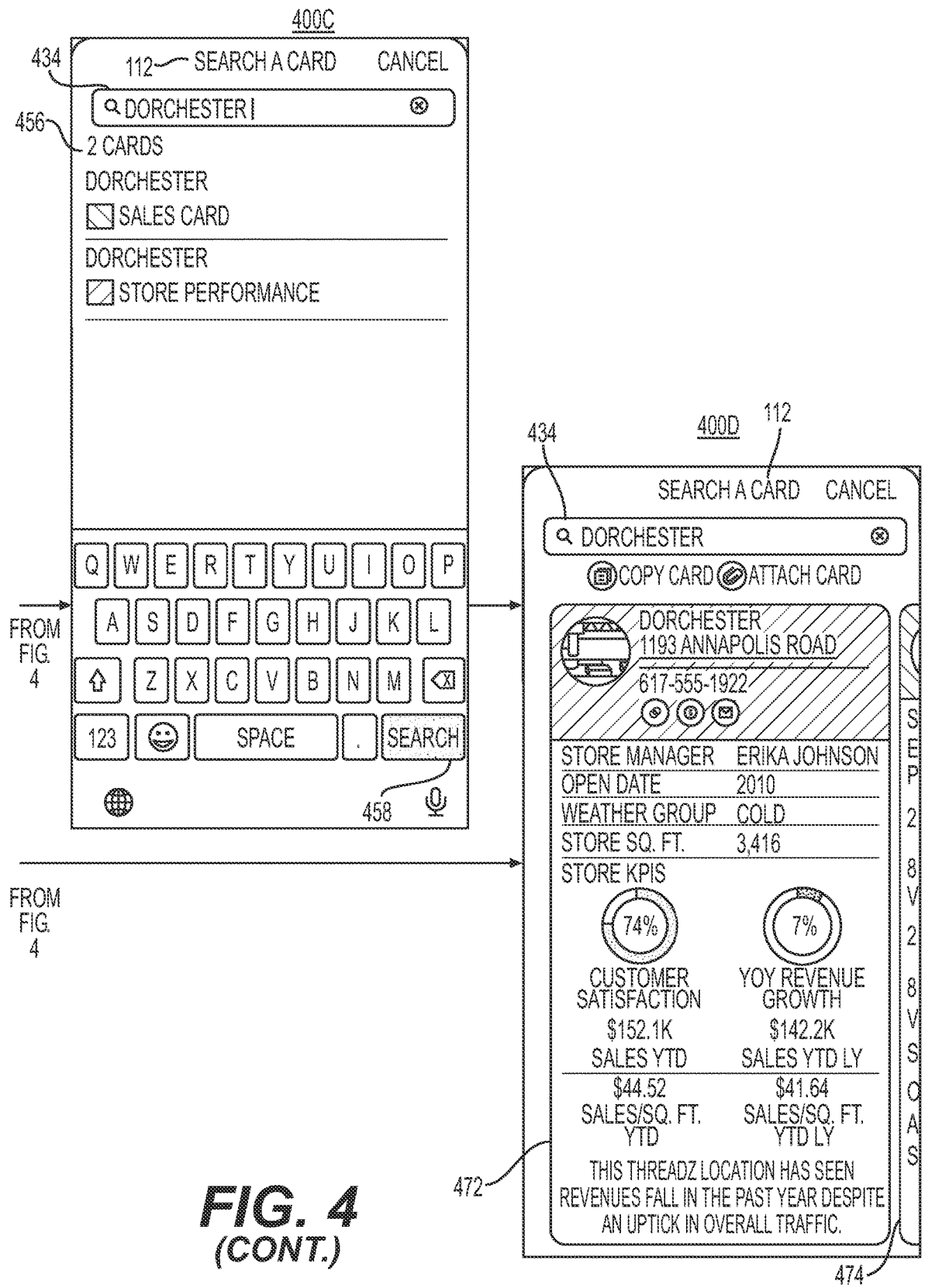

FIG. 4 shows sequential views of an exemplary user interface enabling text input for keyword identification, in a flow diagram format. At stage 400A, a top portion of the user interface may comprise text fields of a typing-enabled application 220 (e.g., an e-mail application), and a bottom portion of the user interface may comprise a smart keyboard 240. As a user 101 types text into a text field such as a body of an e-mail, a smart keyboard extension (e.g., the smart keyboard extension 114) may monitor the text being typed to determine whether a word, a portion of a word, a phrase, or a portion of a phrase matches any keyword in a keyword list. As explained above, a keyword list may include keywords representing entities that are associated with corresponding information cards. At stage 400A, the smart keyboard extension 114 has identified the word "Dorchester" 412 in the text field as matching a number of keywords. The smart keyboard extension 114 may then display the matching keywords in any suitable location on or near the smart keyboard 240. In the example of FIG. 4, the smart keyboard 240 displays the keywords 416A, 416B, and 416C (e.g., Dorchester, Dorchester City, etc.) in the suggestion bar 418 toward the top of the smart keyboard 240. Each of the displayed keywords 416A, 416B, and 416C may be interactive, meaning the user 101 may be able to select a keyword by, for example, hovering over, clicking, or tapping on the desired keyword. The number of information cards generated/retrieved for each keyword may also be presented to the user. In the example of FIG. 4, such quantity is displayed next to each keyword presented on the suggestion bar 418.

Once the user 101 selects a keyword (e.g., "Dorchester" 416A), the user interface may transition to stage 400D to display one or more information cards associated with the selected keyword. Notably, at stage 400D, the entirety of the user interface may comprise a search result interface of the application 112. In other words, the user interface may seamlessly transition from the typing-enabled application 220 to the application 112, without the user 101 having to close or hide the typing-enabled application 220 and subsequently open the application 112 in order to view the search results. Further, because the user 101 has already selected the keyword "Dorchester" 416A via the smart keyboard 240 at stage 400A and the search has already been conducted based on the selected keyword, the user 101 does not need to re-enter the keyword when the user interface transitions to stage 400D. As shown in stage 400D, the application 112 may already display the user-selected keyword "Dorchester" 416A in the search bar 434, and the information cards 472 and 474 retrieved from the server 120 in a card display portion. The user 101 may be able to scroll through the displayed information cards by making any suitable motion to interact with the display, such as, for example, swiping. The information cards may be sorted in an alphabetical order, or in a ranked order using any suitable ranking algorithm. For example, the information cards may be ranked based on user characteristics and/or usage data collected in the user device 110, from the server 120, and/or from any other computing system connected via the network 105. The collected data may be specific to the user 101, or may represent the entire user base. The information card(s) displayed at stage 400D may be in an interactive format (e.g., Hypertext Markup Language (HTML)), meaning various data elements within the information card can be selected, manipulated, and/or otherwise interacted with by the user 101 for further customization and/or information retrieval. Certain interactive features of the information cards displayed in the user interface of the application 112 will be discussed in greater detail below in reference to FIGS. 5 and 7.

Each of the information cards 472 and 474 displayed at stage 400D may include attributes and/or metrics associated with the corresponding entity. In the example shown at stage 400D of FIG. 4, the information card 472 includes a name, an address, a phone number, a store manager, an open date or an age, a weather group, a store area, key performance indicators (e.g., a customer satisfaction, a year-over-year revenue growth, a year-to-date sales, a year-to-date sales last year, a year-to-date sales per square foot, a year-to-date sales per square foot last year, etc.), a summary, etc. for the entity "DORCHESTER."

If the user 101 is not satisfied with the information cards displayed at stage 400D, the user 101 may utilize the search bar 434 to perform an additional search using different keywords. Alternatively, the user 101 may select "Cancel" to transition back to the typing-enabled application 220, and modify or update the text to receive additional keyword suggestions in the suggestion bar 418 of the smart keyboard 240.

Alternatively or additionally (i.e., in lieu of selecting a keyword presented on the smart keyboard 240), at stage 400A the user 101 may be able to enter a manual search mode by selecting a manual search button 414 in the smart keyboard 240. In the example of FIG. 4, the manual search button 414 is included in the suggestion bar 418 positioned toward the top of the smart keyboard 240, but may be positioned at any suitable location. Upon the user selecting the manual search button 414, the user interface may transition to stage 400B to display a search interface. Notably, at stage 400B, the user interface may now comprise a search interface of the application 112, with the smart keyboard 240 in any suitable location in the user interface. Again, the user interface may seamlessly transition from the typing-enabled application 220 to the application 112, without the user 101 having to close or hide the typing-enabled application 220 and subsequently open the application 112 in order to perform a search. Because the user 101 has not selected any keyword and has instead selected the manual search mode at stage 400A, the application 112 may display a search bar 434 for the user 101 to enter text at stage 400B. The application 112 may also display a recently-searched keyword list 436, from which the user 101 may make a selection. To that end, the application 112 may be configured to store keywords that was previously input and/or selected by the user 101, and may subsequently display those keywords for user selection in the search interface. At stage 400B, therefore, the user 101 may select a keyword from the recently-searched keyword list 436, or may enter text in the search bar 434. If the user 101 opts to enter text in the search bar 434, the recently-searched keyword list 436 may disappear and a candidate keyword list including one or more keywords matching the entered text may appear near or below the search bar 434, from which the user 101 may make a selection. In some embodiments, the recently-searched keyword list 436 and the candidate keyword list may be displayed simultaneously for user selection.

Once the user 101 makes a keyword selection from the recently-searched keyword list 436, candidate keyword list, or merely by entering text that might match a keyword representing an entity, the user interface may transition to stage 400C. At stage 400C, the search bar 434 may display the selected keyword, which may represent an entity associated with one or more information cards. The application 112 may also display a summary 456 of information cards that are associated with the keyword. The summary 456 may include information on a number of information cards that are associated with the keyword, a type of each information card associated with the keyword (e.g., sales card, store performance, etc.), and/or other information that may help the user 101 in determining whether the selected keyword will lead to relevant information cards. In other words, the user 101 may be able to determine whether the selected keyword will lead to desired information cards by reviewing the summary 456.

At stages 400B and 400C, because the user might need to input text in the search bar 434, a keyboard interface may be displayed in a portion of the user interface. As alluded to above, the keyboard displayed at stages 400B and 400C may be the smart keyboard 240. However, the suggestion bar 418 of the smart keyboard 240 may be hidden, as the functionalities provided by the suggestion bar 418 may not be needed in the search interface of the application 112. Alternatively, the keyboard displayed at stages 400B and 400C may be a built-in keyboard (e.g., a standard keyboard installed as a part of the OS), or another keyboard that is different from the smart keyboard 240 enabled by the smart keyboard extension 114, as the functionalities of the smart keyboard 240 may not be needed in the search interface of the application 112.

Once the user 101 is satisfied with or confident about the keyword, the user 101 may initiate a search based on the keyword by interacting with (e.g., hovering over, clicking, tapping, etc.) the magnifying glass icon in the search bar 434, or the "Search" button 458 on the keyboard. The user interface may then transition to stage 400D to display one or more information cards associated with the keyword, as explained above.

Figure 5:
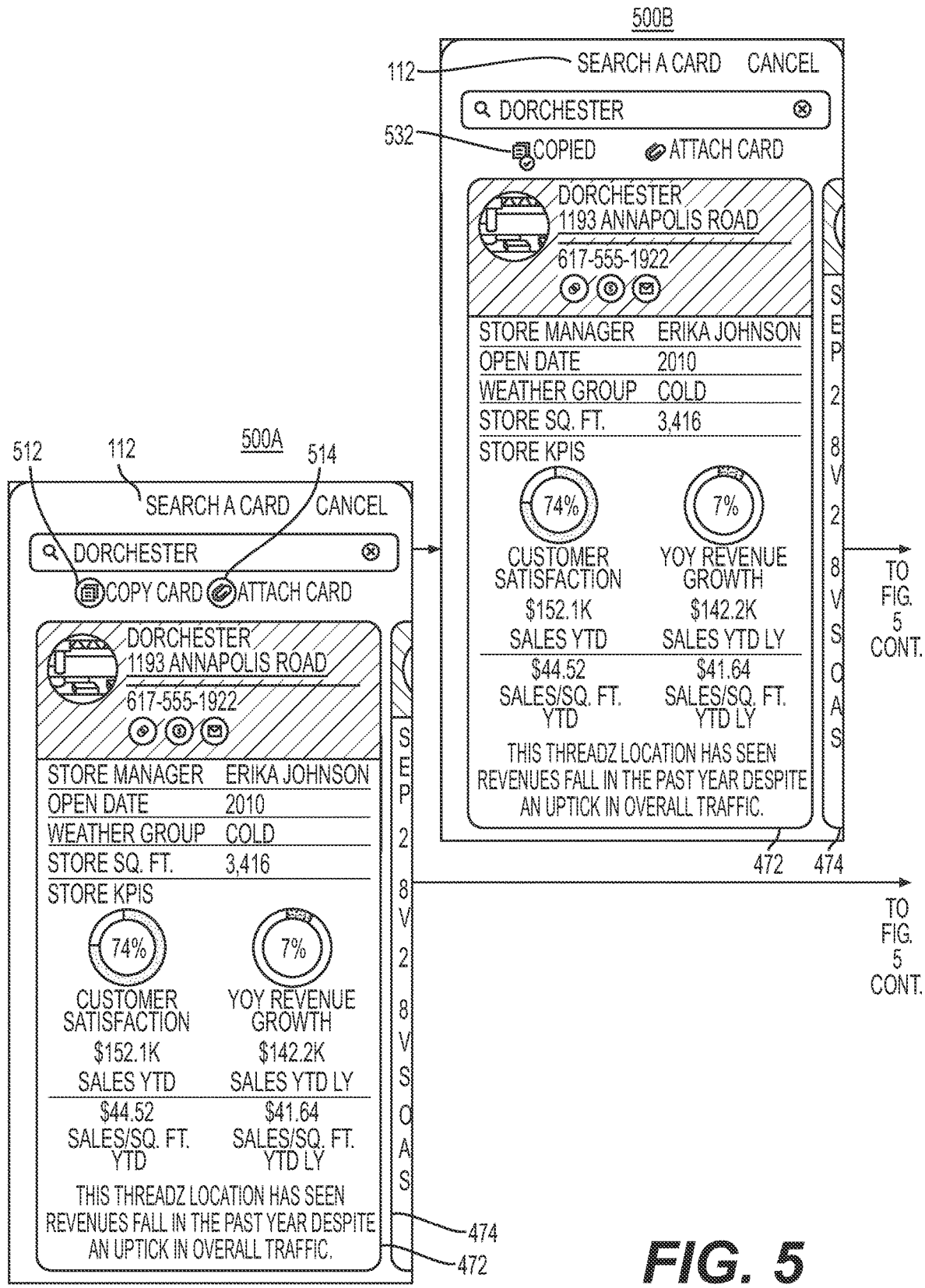
FIG. 5 shows sequential views of a user interface enabling copying and pasting of an information card into a text field of a typing-enabled application, according to one aspect of the present disclosure.
Figure 5:
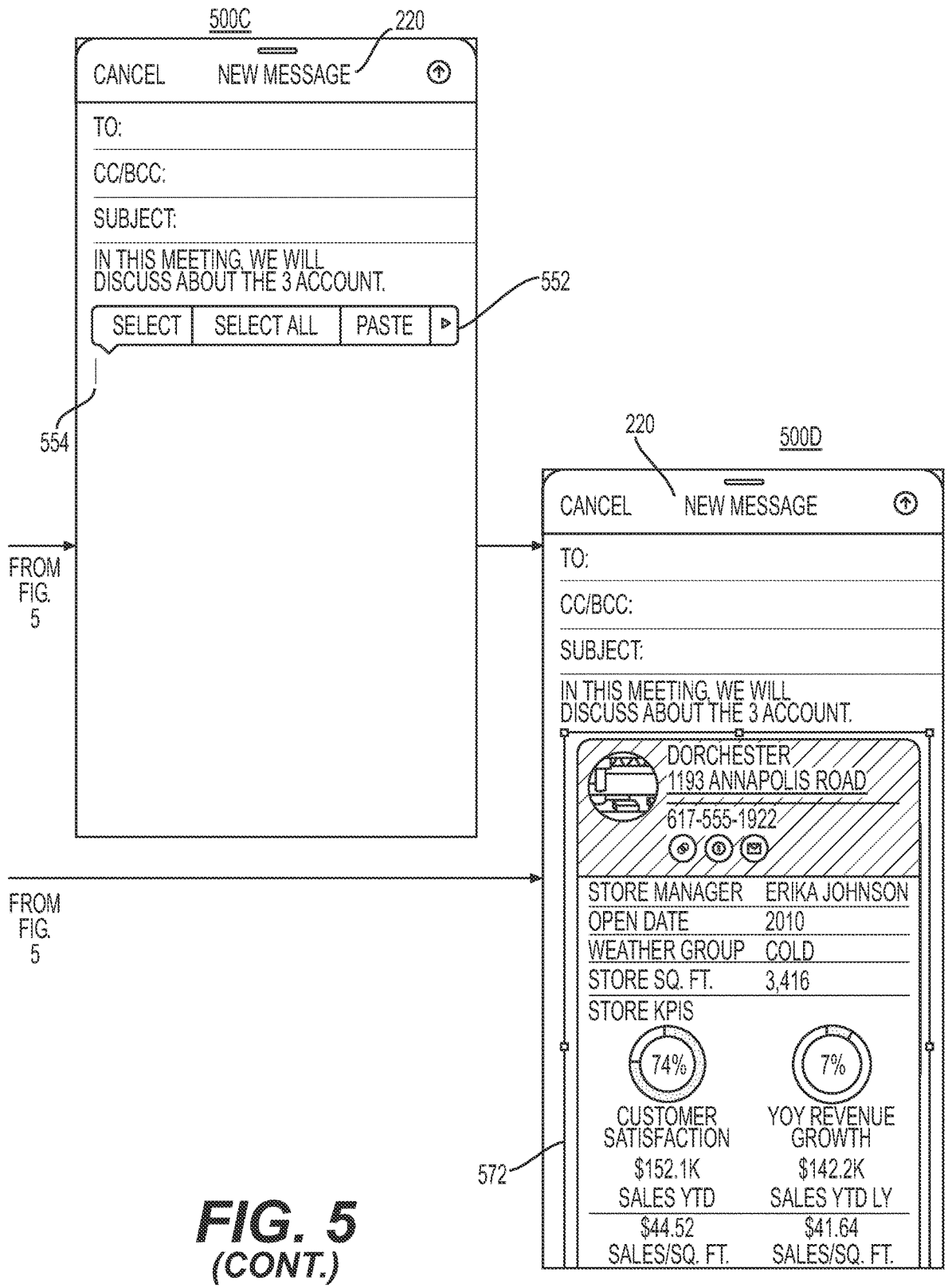

FIG. 5 shows sequential views of an exemplary user interface enabling copying and pasting of an information card into a text field of a typing-enabled application. At stage 500A, as discussed above in reference to stage 400D in FIG. 4, one or more information cards 472, 474 associated with a selected keyword (e.g., "Dorchester") may be displayed in the interface of the application 112. The application 112 may also present multiple options for providing information contained in an information card to a different application such as the typing-enabled application 220. For example, the application 112 may display a copy option 512 (e.g., "COPY CARD") and an attach option 514 (e.g., "ATTACH CARD").

The attach option 514 may enable the user 101 to append the information card 472 within the text field of the typing-enabled application 220, which the user 101 has been using before the user interface transitioned to that of the application 112. In one embodiment, upon the user 101 selecting the attach option 514 at stage 500A, the user interface may transition to stage 500D. At stage 500D, the user interface may transition back to that of the typing-enabled application 220 the user has been typing in, and the information card for which the attach option 514 has been selected may be inserted into the text field of the typing-enabled application 220. Particularly, the information card 572, which may be a duplicate of the information card 472, may replace the text that led to the retrieval of the keyword associated with the information card. For example, at stage 500D, the text "Dorchester" 412 that was identified at stage 400A in FIG. 4 may be replaced with the information card 572. In some cases, the information card 572 may be in an image format. In other words, the information card 572 may be an image of the information card 472, which may be in the same or a different format (e.g., interactive format). By using the attach option 514, the user 101 may quickly attach an information card 572 within the text field, allowing the user 101 and any future recipient of the text/message to visually examine the information card 572 displayed in an intuitive, user-friendly manner. In some embodiments, the application 112 may convert an information card from its interactive format (e.g., HTML) to an image format, in order to attach/ insert the information card into the text field of a typing-enabled application 220 as an image. It should be noted that the format of the information card 572 may not be limited to an image format, and may be in any format that is suitable for including into a typing-enabled application 220. For example, the information card 572 may be in a tabular format, a rich text format, a plain text format, etc.

The copy option 512 may also enable the user 101 to append the information card 472 in a text field of the typing-enabled application 220. However, the copy option 512 may provide a functionality that is different from that of the attach option 514, in that the information card 472 may be inserted into a user-selected location within the text field. With the attach option 514, the appended information card 572 may be positioned at the location where the original text that led to the retrieval of the information card previously existed. In contrast, a selection of the copy option 512 may save the information card 472 in a clipboard, and may enable the user 101 to decide the location at which the information card 472 may be placed.

Upon the user 101 selecting the copy option 512, the user interface may transition to stage 500B. At 500B, the text representing the copy option 512 "COPY CARD" may be updated, so as to inform the user 101 that the information card 472 has been successfully copied to the clipboard. For example, the text representing the copy option 512, e.g., "COPY CARD," may be updated to a copy status indicator 532. The copy status indicator 532 may be represented by any text indicative of a successful (or unsuccessful) copy operation, for example, "COPIED." The icon next to the copy status indicator 532 may also graphically indicate that the copy operation has been completed, as shown in stage 500B. Both the texts and/or icons representing the copy option 512 and copy status indicator 532 may be color-coded, for the user 101 to more easily confirm the status of the copy operation. For example, the text and/or icon representing the copy option 512 may be color-coded in blue, while the text and/or icon representing the copy status indicator 532 may be color-coded in green. If the copy operation cannot be completed for any reason, the copy status indicator 532 may be represented by any text and/or icon that visually indicate a copy operation failure. The copy status indicator 532 may also be color-coded accordingly, for example, in red. In some cases, if the copy option cannot be completed, a notification (not shown) may pop up over the display, indicating that copying was unsuccessful.

Once the information card 472 has been successfully copied to a clipboard (which may be indicated by the copy status indicator 532), the user interface may transition to stage 500C. At stage 500C, the user interface may transition back to that of the typing-enabled application 220 the user 101 has been typing in. The user 101 may be allowed to paste the information card 472 into any location within the text field, by opening up a text editing menu 552 whenever and wherever the user desires. For example, upon the user interface transitioning to that of the typing-enabled application 220, the user 101 may add to, modify, or delete the text that has been typed, before pasting the information card 472 into a desired location. Therefore, the user 101 may control the timing of placing the information card into the text field, and also the exact location at which the information card is inserted. The text editing menu 552 may be opened by making any suitable motion/action with or without an input device (e.g., mouse, keyboard, etc.). For example, the text editing menu 552 may be opened by right-clicking on a mouse at a desired location within the text field. As another example, the text editing menu 552 may be opened by tapping and holding for a predetermined time period on a desired location within the text field, and releasing the hold. As another example, the text editing menu 552 may be included in a toolbar or drop-down menu of the typing-enabled application 220. The text editing menu 552 may display various options for manipulating text within the typing-enabled application 220, such as to select, select all, paste, cut, copy, change font, change font size, bold, italic, underline, and so on. At stage 500C, the user 101 may select an option to paste the copied information card 472 into the text field.

Upon the user 101 selecting to paste the copied information, the user interface may transition to stage 500D. At stage 500D, the information card 572, which may be the information card 472 in an image format or other immediately viewable format, may be pasted into a location within the text field. Particularly, the placement of the information card 572 within the text may be dependent on the location of the text cursor 554 at the time the user makes a selection on the text editing menu 552 at stage 500C. Thus, using the copy option 512, the user 101 may choose the exact location at which the information card may be inserted.

In lieu of inserting an information card into a text field as an image or other immediately viewable format, the present disclosure also contemplates inserting a link associated with the information card into the text field. For example, in response to the user 101 selecting the attach card option 514 or the paste option in the text editing menu 552, a selectable link (e.g., a hyperlink) may be inserted at an appropriate location within the text field. The link may be inserted into the text-field by the typing-enabled application 220 operating in conjunction with the application 112. In one embodiment, text in the text field associated with the information card (e.g., a keyword or other text selected by the user 101) may be converted to a hyperlink which, when activated (e.g., by clicking or otherwise interacting with the link), may cause a display of the corresponding information card, either within the typing-enabled application 220 or within a separately-opened application, such as a web browser. In some embodiments, a link may be inserted separately from the matching text. When the user 101 or message recipient selects the link, the corresponding information card 472 may be retrieved and displayed via the application 112. However, if the application 112 is not installed on the device of the user 101 or message recipient, selection of the link may open an app store or any location on the web from which the application 112 can be downloaded. An advantage of inserting a link is that the information card 472 that is seen by the user 101 or the message recipient upon activating the link may be a latest version containing up-to-date information at the time the link is accessed, while an image file (or other format) inserted directly into a message might not be up-to-date by the time the image file is presented to the user 101 or message recipient. In other words, the application 112 may send a new card request every time the link is selected, or the link may lead to a display of the card that is kept up-to-date, such that the latest version of the information card may be generated and presented.

Figures 6A, 6B:
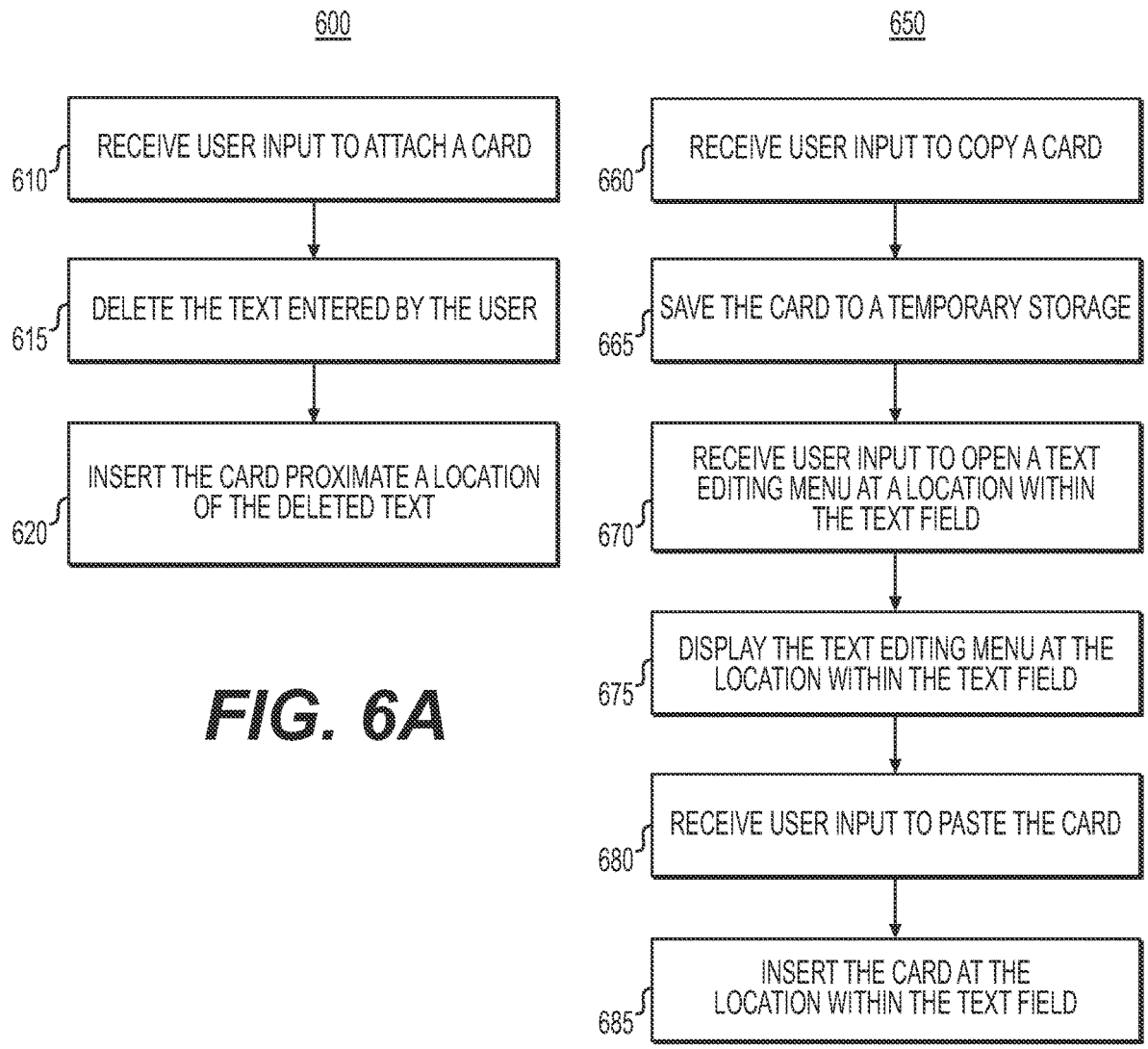
FIGS. 6A-6B show flowcharts illustrating exemplary methods of appending an information card into a text field of a typing-enabled application, according to one or more aspects of the present disclosure.

FIGS. 6A-6B show flowcharts illustrating exemplary methods of appending an information card into a text field of a typing-enabled application, according to one or more aspects of the present disclosure. The method 600 of FIG. 6A illustrates the process flow when the user 101 selects an attach option 514 shown at stages 500A and 500D in FIG. 5. The method 650 of FIG. 6B illustrates the process flow when the user 101 selects a copy option 512 shown at stages 500A-500D in FIG. 5. Notably, methods 600 and 650 may be performed by the smart keyboard extension 114 in conjunction with the application 112 and/or the typing-enabled application 220, and may each represent a process that may be performed subsequent to the method 300 of retrieving and displaying an information card to the user 101.

In method 600, at step 610, the application 112 may receive a user input to attach an information card to a text field of a typing-enabled application 220. As discussed above in reference to FIG. 5, the user input may be a selection of the attach option 514 by the user 101. At step 615, the application 112, in conjunction with the typing-enabled application 220, may delete the text entered by the user 101 that led to the retrieval and display of the information card. In order to delete the text within the typing-enabled application 220, the application 112 may transmit or supply instructions, commands, or appropriate software code to the typing-enabled application 220, to delete the text that led to the information card. At step 620, the application 112, in conjunction with the typing-enabled application 220, may insert the information card proximate a location of the deleted text. For example, the information card may replace the text entered by the user 101. In one embodiment, the application 112 may transmit or supply instructions, commands, or appropriate software codes to the typing-enabled application 220 to insert and display the information card within the text field.

In method 650, at step 660, the application 112 may receive a user input to copy an information card. As discussed above in reference to FIG. 5, the user input may be a selection of the copy option 512 by the user 101. At step 665, the application 112 may save the information card to a temporary storage such as, for example, a clipboard. The information card may be saved in the temporary storage as an image or any other suitable format discussed above. That that end, the application 112 may convert the information card in its interactive format to an image format or any other suitable format discussed above, before saving the information card in the temporary storage. As known in the art, a clipboard is a location in a computer's memory that temporarily stores data that was cut or copied from a document, text field, etc. A clipboard retains the copied information until the user 101 cuts or copies different data, or logs out of the session. At step 670, the typing-enabled application 220 may receive a user input to open a text editing menu 552 at a location within a text field. As discussed above in reference to FIG. 5, the user 101 may right-click on a mouse, or make any suitable motion/action, to open the text editing menu 552 at a user-desired location within the text field.

With continuing reference to method 650, at step 675, the typing-enabled application 220 may display the text editing menu 552 at the location within the text field. At step 680, the typing-enabled application 220 may receive a user input to paste the information card into the text field. At step 685, the typing-enabled application 220 may insert the information card at the location within the text field. The inserted information card may be in an image format. As discussed above, the location at which the information card is placed may be selected by the user in previous step 670, for example by the user 101 opening a text editing menu 552 at a particular location within the text field. For example, the user 101 may right-click, tap, or tap and hold at a desired location within the text field, at which a text cursor may appear upon the user action (i.e., right-click, tap, or tap and hold). The text editing menu 552 may open proximate the text cursor, as shown in FIG. 5. The information card may be inserted at the location of the text cursor within the text field.

Figure 7:
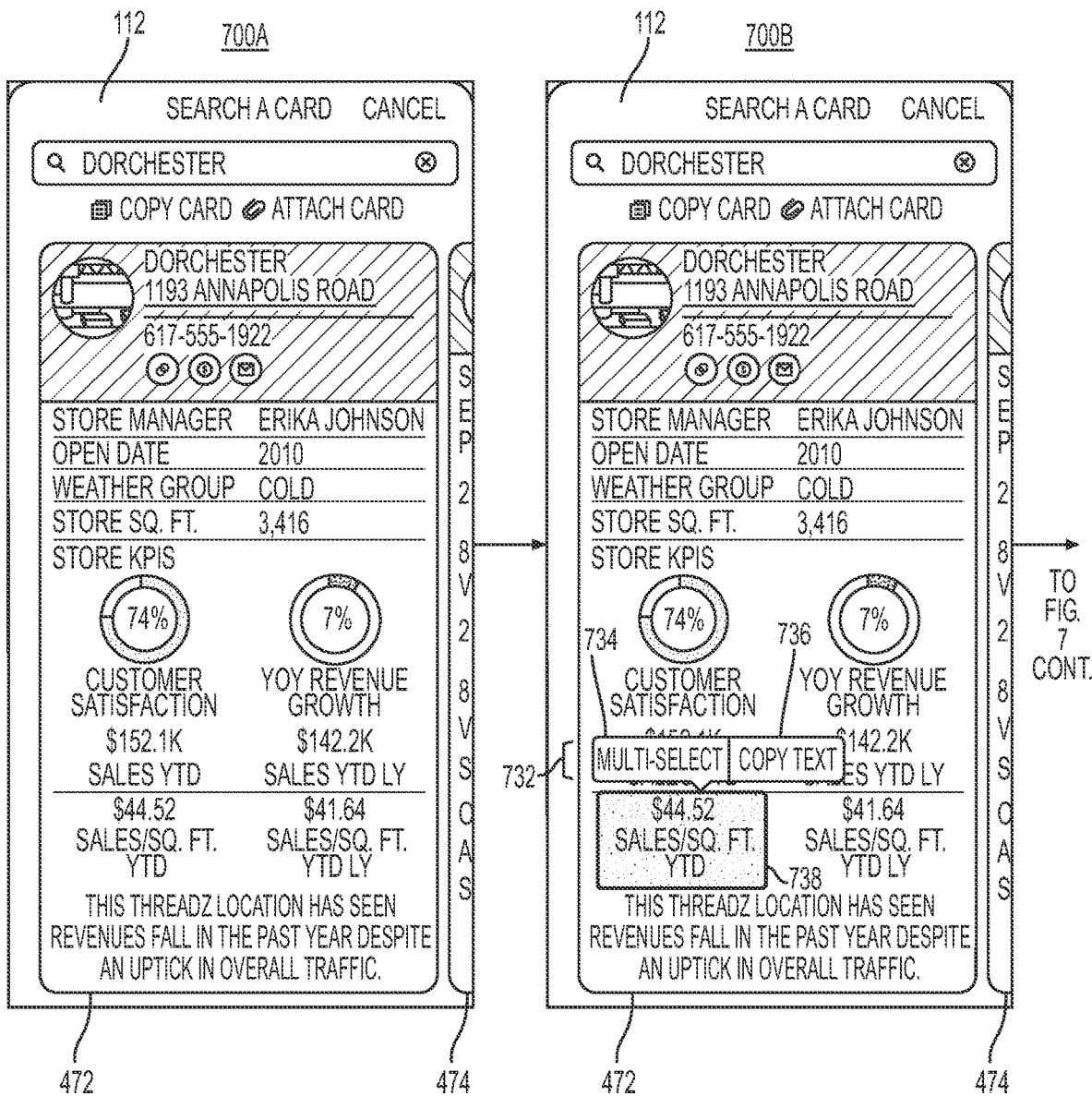
FIG. 7 shows sequential views of a user interface enabling copying and pasting of information content pertaining to one or more user-selected sections of an information card, according to one aspect of the present disclosure.
Figure 7:
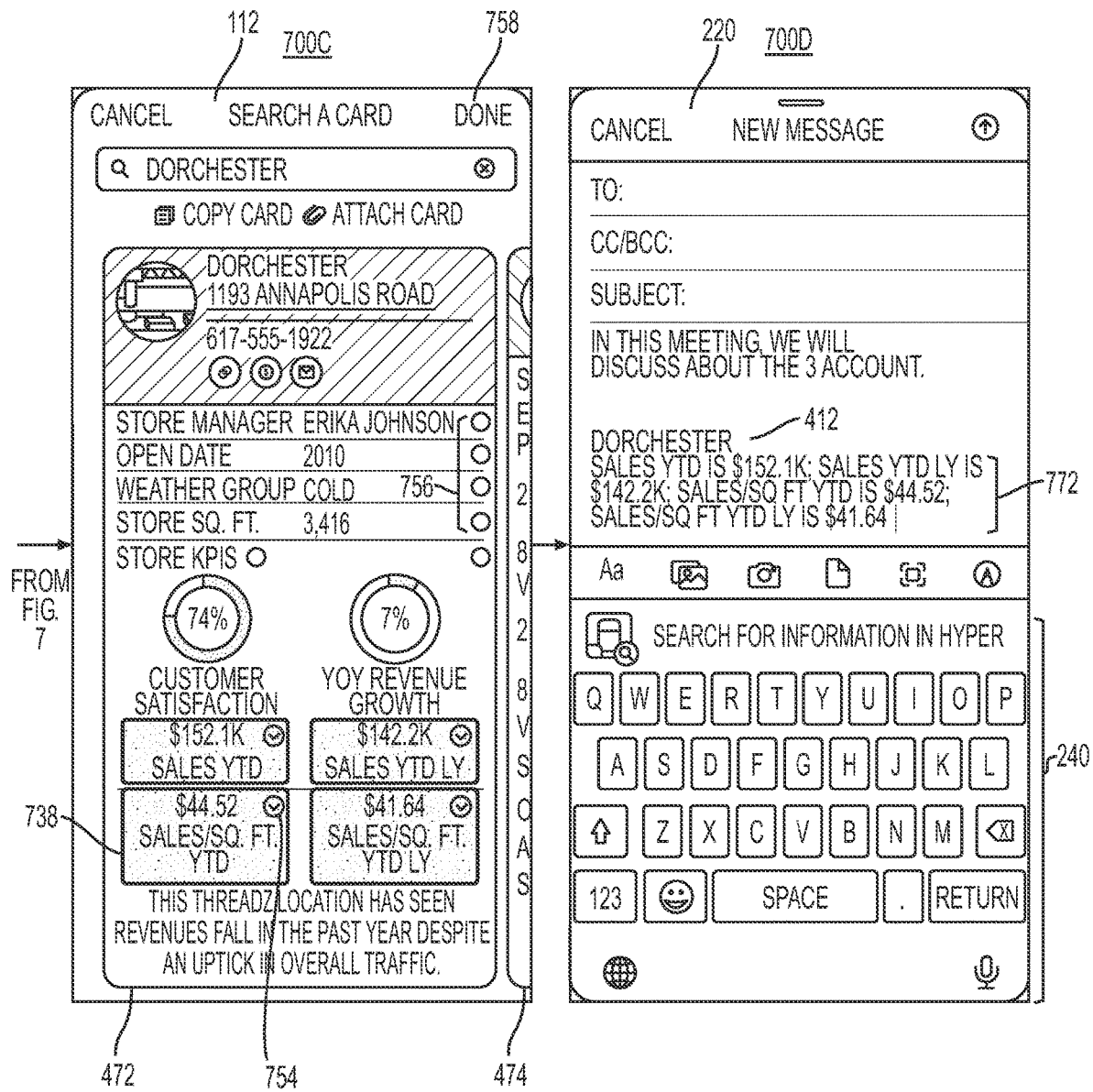

FIG. 7 shows sequential views of a user interface enabling a user to copy and paste information content pertaining to one or more user-selected sections of an information card. At stage 700A, as discussed above in reference to stage 400D in FIG. 4, one or more information cards 472, 474 associated with a selected keyword (e.g., "Dorchester") may be displayed in the interface of the application 112. In addition to, or instead of, the copy and attach options 512, 514 discussed above in reference to FIG. 5, the application 112 may allow the user to select a particular section (e.g., a cell or a data element) of the displayed information card 472 or 474, in order to copy and save information content pertaining to the selected section into the clipboard. Alternatively, the application 112 may allow the user to select multiple sections of the displayed information card 472 or 474, in order to copy and save information content pertaining the selected sections into the clipboard. The information content associated with each section may be copied and saved as a text string. The text string may be generated based on data that underlies the information card containing the selected section. More specifically, the text string may be generated based on data that underlies the corresponding section selected by the user 101. For example, a text string may be in the format "{object name} is {value}". The object name may be an attribute, property, feature, or dimension, and the value may be a numerical value, or an alphabetical or alphanumerical value or sequence of characters, which corresponds to the object name. Also, the object name may be a metric name and the value may be a metric value corresponding to the object name. The format in which a text string may be arranged is not limited to the examples discussed explicitly herein, and may be configurable by a user 101, an administrator of the system 100, or other entity.

As discussed above, a user 101 may select a section of the displayed information card 472 from which to extract information content. The selection can be made by the user 101 clicking, tapping, or tapping and holding for a predetermined time period (or any other suitable interactive gesture) on a desired cell within, or portion of, the information card. Upon receiving such a selection, the user interface may transition to stage 700B. The user interface at stage 700B may indicate that the user 101 has selected, for example, a cell 738. The selection may be indicated by including a border around the selection, changing the background color of the selection, or otherwise visually differentiating the selection from other cells in the information card. Additionally, a selection menu 732 may be displayed proximate the selected cell 738. The selection menu 732 may present at least two options, including a multi-select option 734 and a copy text option 736.

Using the copy text option 736, the user 101 may save information content pertaining to the selected cell 738 into a clipboard. For example, upon the user 101 selecting the copy text option 736, information content pertaining to the selected cell 738 may be saved to a clipboard, the user interface may transition back to that of the typing-enabled application 220, and the user 101 may be able to paste the copied information content into any desired location within the text field of the typing-enabled application 220.

On the other hand, if the user selects the multi-select option 734, various parts, e.g., cells in the information card 472 that are selectable by the user 101, may be visually differentiated, so as to indicate to the user 101 that the cells are selectable. For example, upon the user 101 selecting the multi-select option 734 at stage 700B, the user interface may transition to stage 700C. At stage 700C, cells that are selectable by the user 101 for information content retrieval may be visually differentiated (i.e., made conspicuous). For example, at a suitable location within each selectable cell, an icon or a geometrical shape such as, for example, a check box 756 (e.g., a geometrical shape with a hollow center) may be displayed, signaling that the cell is selectable by the user 101 for information content retrieval. The user 101 may select a cell by clicking or tapping on the corresponding check box 756, or by making any suitable motion/action with or without an input device. Upon the user 101 making a selection, the check box 756 may be filled with a color, and/or a suitable marking (e.g., a check mark) may be placed within the check box 756. For example, the check box 754 indicates that the cell 738 has been selected, via a check mark included in the check box 754. Similarly, additional cells near the cell 738 (i.e., cells including SALES YTD, SALES YTD LY, SALES/SQ. FT. YTD LY information) are shown to have been selected by the user 101. Other suitable graphical user interface (GUI) elements may also be used to indicate that a portion of the information card 472, such as a cell, is available for selection, or that a portion or cell has been selected by a user 101. Once the user 101 has selected all the desired cells, the user 101 may select a selection complete button 758 at stage 700C.

When the user 101 has made all the selections (e.g., by selecting the selection complete button 758), the user interface may transition to stage 700D. Particularly, the user interface may transition back to that of the typing-enabled application 220 the user 101 has been typing in. The user 101 may be allowed to paste the information content 772 pertaining to the selected cell(s) into any location within the text field, by opening up a text menu (e.g., text editing menu 552) whenever and wherever the user desires. For example, upon the user interface transitioning to that of the typing-enabled application 220, the user 101 may add to, modify, or delete the text that has been typed, before pasting the information content 772 into a desired location. Therefore, the user 101 may control the timing of placing the information content 772 into the text field, and also the exact location at which the information content 772 is placed. Alternatively, upon the user 101 completing the cell selection(s) (e.g., by selecting the selection complete button 758) and the user interface transitioning back to that of the typing-enabled application 220, the information content 772 pertaining to the selected cells may be automatically inserted into a location within the text field of the typing-enabled application 220. For example, the information content 772 may be inserted immediately after or below the text that led to the retrieval of the information card 472 (e.g., "Dorchester" 412). As another example, the information content 772 may be inserted at a location at which the user 101 left a text cursor while previously typing in the text field. If multiple cells have been selected by the user 101 at stage 700C, the text strings associated with the selected cells that are pasted onto the text field may be separated from each other by punctuation marks (e.g., semicolons) or spaces, or may be placed in separate lines, or may otherwise be arranged visually, to allow the user 101 or message recipient to identify each text string clearly.

Once the information card(s) and/or text strings associated with cells of the information card(s) have been inserted into the text field as discussed in reference to FIGS. 5 and 7, the user 101 may be presented with or may activate the smart keyboard 240 again, allowing the user 101 to further modify the text, search for additional information cards, and copy/paste information card(s) and/or text string associated with individual cells at appropriate places within the text field. In other words, the processes illustrated in FIGS. 5 and 7 may be repeated by the user 101 until all desired information has been viewed and/or included in the text field of the typing-enabled application 220.

Figure 8:
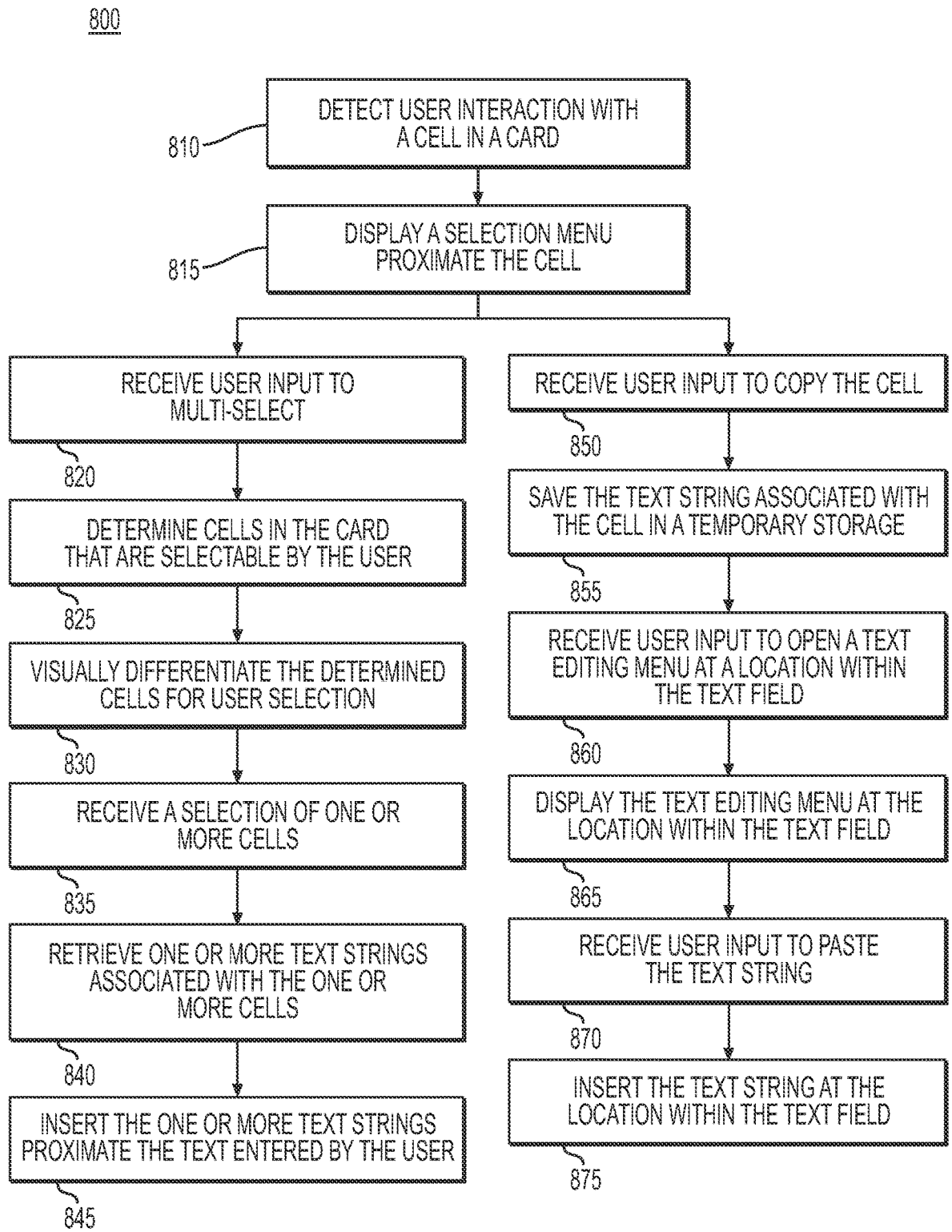
FIG. 8 shows a flowchart illustrating an exemplary method of inserting information content into a text field of a typing-enabled application based on a selection of one or more sections in an information card, according to one aspect of the present disclosure.

FIG. 8 shows a flowchart illustrating an exemplary method 800 of inserting information content into a text field of a typing-enabled application based on a selection of one or more sections in an information card, according to one aspect of the present disclosure. Notably, method 800 may be performed by the smart keyboard extension 114 in conjunction with the application 112 and/or the typing-enabled application 220, and may represent a process that may be performed subsequent to method 300 of retrieving and displaying an information card to the user 101.

At step 810, the application 112 may detect user interaction with a cell in an information card. As discussed above, the detected user interaction may be, for example, the user 101 clicking, tapping, or tapping and holding for a predetermined time period on a cell in an information card. The detected user interaction may indicate that the user 101 has selected the cell. At step 815, the application 112 may display a selection menu proximate the cell. As illustrated in FIG. 7, the selection menu 732 may allow the user 101 to either select additional cells in the information card (e.g., via the multi-select option 734) or copy the text string associated with the selected cell (e.g., via the copy text option 736). If the user 101 selects the multi-select option 734, the method 800 proceeds to step 820. If the user 101 selects the copy text option 736, the method 800 proceeds to step 850.

At step 820, the application 112 may receive a user input to select additional cells in the information card. The user input may comprise the user 101 selecting the multi-select option 734 in the selection menu 732. At step 825, upon receiving the user input to select additional cells in the information card, the application 112 may determine cells in the information card that are selectable by the user 101. In general, cells containing data suitable to be represented in the "{object name} is {value}" format may be determined to be selectable. On the other hand, cells that contain linkings, such as the cells enclosing various buttons in the bottom portion of the header of the information card (i.e., the hatched portion of the information card shown in FIG. 7), may be determined to be not selectable. At step 830, the application 112 may visually differentiate the selectable cells, enabling the user 101 to make a selection. The manner in which the cells may be visually differentiated was discussed above in reference to FIG. 7. At step 835, the application 112 may receive user's selection of one or more of the cells. As explained above, the user 101 may indicate that all the desired cells have been selected by, for example, selecting "Done" shown in FIG. 7. At step 840, the application 112 may retrieve one or more text strings associated with the selected one or more cells. At step 845, the application 112, in conjunction with the typing-enabled application 220, may insert the one or more text strings proximate the text typed by the user 101 that led to the retrieval of the information card (e.g., the text "Dorchester" 412 in FIG. 7). The application 112 may transmit or supply instructions, commands, or appropriate software codes to the typing-enabled application 220 to insert the one or more text strings. Further, in lieu of automatically inserting the text strings proximate the typed text, the retrieved text strings may be merely saved in a temporary storage such as, for example, a clipboard. Then, the user 101 may have an option to open up a text editing menu at a desired location within the text field, and paste the text strings at the desired location by selecting a paste option in the text editing menu.

Alternatively, at step 850, the application 112 may receive a user input to copy the cell that was selected by the user 101 at step 810. The user input may comprise the user 101 selecting the copy text option 736 in the selection menu 732. At step 855, the application 112 may save a text string associated with the cell in a temporary storage (e.g., clipboard). At step 860, the typing-enabled application 220 may receive a user input to open a text editing menu 552 at a location within the text field. As discussed above in reference to FIG. 5, the user 101 may right-click on a mouse, or make any suitable motion/action, to open the text editing menu 552 at a particular, user-desired location within the text field. The location may be indicated by a text cursor, or any other suitable marker or symbol placed within the text field. At step 865, the typing-enabled application 220 may display the text editing menu 552 at the location within the text field. At step 870, the typing-enabled application 220 may receive a user input to paste the text string into the text field. At step 875, the typing-enabled application 220 may insert the text string at the location within the text field. As discussed above, the location at which the text string is inserted may be selected by the user in previous step 860, for example by the user 101 opening a text editing menu 552 at a particular location within the text field. For example, the user 101 may right-click, tap, or tap and hold at a desired location within the text field, at which a text cursor may appear upon the user action (i.e., right-click, tap, or tap and hold). The text editing menu 552 may open up proximate the text cursor, as shown in FIG. 5. The text string may be inserted at the location of the text cursor within the text field.

Embodiments of the present disclosure and all of the functional operations described in this disclosure can be implemented in digital electronic circuitry, or in computer software, firmware, or hardware, including the structures disclosed in this disclosure and their structural equivalents, or in combinations of one or more of them. Embodiments of the present disclosure can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the present disclosure can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the invention or of what may be claimed, but rather as descriptions of features specific to particular embodiments of the invention. Certain features that are described in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

What is claimed is:

1. A computer-implemented method of retrieving relevant information content while typing, the method comprising:

identifying, by an application extension of a first application, text being entered by a user into a text field of a second application;

determining, by the application extension, one or more keywords in a keyword list that match the text;

presenting, by the application extension, the one or more keywords;

receiving, by the application extension, a selection of a keyword from the one or more keywords;

generating, by the first application, a request comprising the selected keyword;

transmitting, by the first application, the request to a server configured to generate information cards or executing, by the first application, the request against a local storage storing information cards;

receiving, by the first application, an information card related to the selected keyword in response to the request;

presenting, by the first application, the information card; and inserting, by the second application, information content associated with the information card into the text field.

2. The computer-implemented method of claim 1, wherein the text comprises a term, a portion of a term, multiple terms, or a combination thereof.

3. The computer-implemented method of claim 1, the second application comprises a typing-enabled application.

4. The computer-implemented method of claim 1, wherein the one or more keywords are presented at a location within a keyboard enabled by the application extension.

5. The computer-implemented method of claim 1, wherein the information content associated with the information card is an image of the information card.

6. The computer-implemented method of claim 1, wherein the information content associated with the information card is a text string associated with the information card.

7. The computer-implemented method of claim 1, further comprising:
converting, by the first application, the information card from an interactive format to an image format.

8. The computer-implemented method of claim 1, wherein the information content inserted into the text field replaces the text entered by the user.

9. The computer-implemented method of claim 1, further comprising:
displaying, by the first application, a first option to attach the information card; and
receiving, by the first application, a selection of the first option,
wherein the information content is inserted into the text field upon receiving the selection of the first option.

10. The computer-implemented method of claim 1, further comprising:
displaying, by the first application, a second option to copy the information card;
receiving, by the first application, a selection of the second option; and
upon receiving the selection of the second option, saving, by the first application, the information content in a temporary storage.

11. The computer-implemented method of claim 10, further comprising:
receiving, by the second application, a user input to paste the information card to a user-selected location within the text field,
wherein the information content is inserted into the text field upon receiving the user input to paste the information card.

12. The computer-implemented method of claim 10, wherein the information content saved in the temporary storage is in an image format.

13. The computer-implemented method of claim 1, further comprising:
detecting, by the first application, a user interaction with a cell in the information card;
upon detecting the user interaction, displaying, by the first application, a third option to copy the cell; and
receiving, by the first application, a selection of the third option,
wherein the information content associated with the information card is inserted into the text field upon receiving the selection of the third option, the information content being associated with the cell.

14. The computer-implemented method of claim 1, further comprising:
detecting, by the first application, a user interaction with a cell in the information card;
upon detecting the user interaction, displaying, by the first application, a third option to select multiple cells in the information card;
receiving, by the first application, a selection of the third option;
visually differentiating, by the first application, cells in the information card that are selectable by the user.

15. The computer-implemented method of claim 14, further comprising:
receiving, by the first application, a selection of a plurality of cells from the selectable cells,
wherein the information content associated with the information card is inserted into the text field upon receiving the selection of the plurality of cells, the information content comprising a plurality of text strings associated with the plurality of cells.

16. The computer-implemented method of claim 1, wherein inserting, by the second application, information content associated with the information card into the text field comprises:
converting, by the second application, the text entered by the user to a hyperlink associated with the information card.

17. The computer-implemented method of claim 1, wherein the information content associated with the information card is a link associated with the information card.

18. A system comprising:
one or more processors; and
one or more computer-readable media comprising instructions that, when executed by the one or more processors, cause the one or more processors to perform operations for retrieving relevant information content while typing, the operations comprising:
identifying, by an application extension of a first application, text being entered by a user into a text field of a second application;
determining, by the application extension, one or more keywords in a keyword list that match the text;
presenting, by the application extension, the one or more keywords;
receiving, by the application extension, a selection of a keyword from the one or more keywords;
generating, by the first application, a request comprising the selected keyword;
transmitting, by the first application, the request to a server configured to generate information cards or executing, by the first application, the request against a local storage storing information cards;
receiving, by the first application, an information card related to the selected keyword in response to the request;
presenting, by the first application, the information card; and
inserting, by the second application, information content associated with the information card into the text field.

19. One or more non-transitory computer-readable media storing instructions that, when executed by one or more processors, cause the one or more processors to perform operations for retrieving relevant information content while typing, the operations comprising:
identifying, by an application extension of a first application, text being entered by a user into a text field of a second application;

determining, by the application extension, one or more keywords in a keyword list that match the text;

presenting, by the application extension, the one or more keywords;

receiving, by the application extension, a selection of a keyword from the one or more keywords;

generating, by the first application, a request comprising the selected keyword;

transmitting, by the first application, the request to a server configured to generate information cards or executing, by the first application, the request against a local storage storing information cards;

receiving, by the first application, an information card related to the selected keyword in response to the request;

presenting, by the first application, the information card; and inserting, by the second application, information content associated with the information card into the text field.

* * * * *